No. 728,506. PATENTED MAY 19, 1903.
W. E. SELL.
TOE WEIGHT.
APPLICATION FILED MAR. 23, 1903.
NO MODEL.

Witnesses.
E. B. Gilchrist
N. L. Brennan

Inventor,
William E. Sell,
By his Attorneys,
Thurston & Bates.

No. 728,506. Patented May 19, 1903.

UNITED STATES PATENT OFFICE.

WILLIAM E. SELL, OF CANTON, OHIO, ASSIGNOR TO GILLIAM MANUFACTURING COMPANY, OF CANTON, OHIO, A CORPORATION OF WEST VIRGINIA.

TOE-WEIGHT.

SPECIFICATION forming part of Letters Patent No. 728,506, dated May 19, 1903.

Application filed March 23, 1903. Serial No. 149,138. (No model.)

*To all whom it may concern:*

Be it known that I, WILLIAM E. SELL, a citizen of the United States, residing at Canton, in the county of Stark and State of Ohio, have invented a certain new and useful Improvement in Toe-Weights, of which the following is a full, clear, and exact description, reference being had to the accompanying drawings.

The invention relates particularly to means for fastening the toe-weight to a horse's hoof; and it consists in two spring-arms, which have small lateral extensions near their middle portions and are united at their lower ends and secured to the horse's hoof, combined with a toe-weight having a substantially vertical hole, having lateral recesses to receive the lateral extensions on said spring-arms, substantially as shown, and hereinafter set forth definitely in the claims.

Figure 1:
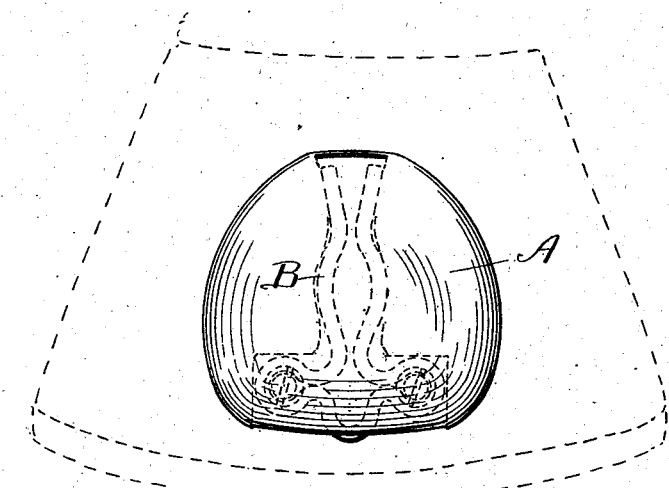
Figure 3:
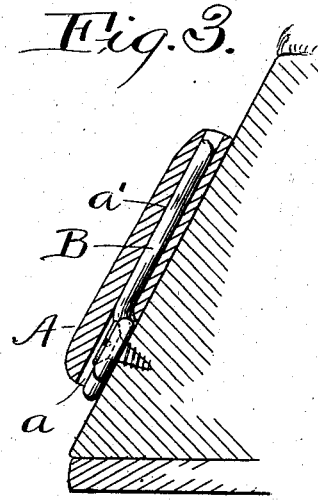
Figure 2:
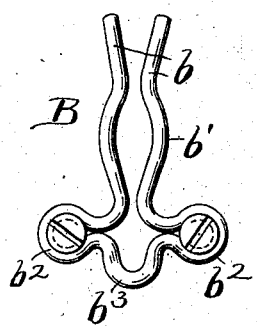
Figure 4:
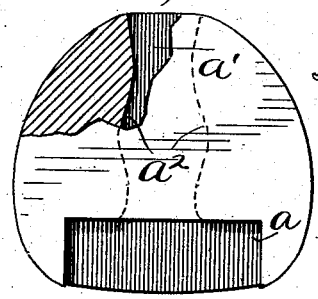

In the drawings, Figure 1 is a front view of a toe-weight provided with the invention. Fig. 2 is a front view of the fastening device. Fig. 3 is a central vertical section thereof; and Fig. 4 is a rear view, partly broken away, of the toe-weight.

The toe-weight A may be of ordinary form, having preferably its rear side curved to fit the hoof. In its lower rear edge is a recess $a$, and extending therefrom upward is a hole $a'$, which is provided with the lateral recesses $a^2$.

The fastening device B may be made of spring-wire substantially as shown, and it has two arms $b$ $b$ connected at their lower ends and extending upwardly, said arms being under tension to hold them apart a short distance, and said arms have small lateral extensions $b'$ formed by bending the arms themselves. The connection between the lower ends of these arms form what may be called a "base" $b^2$, by means of which said fastening device is secured to the hoof by screws or otherwise. When said fastening device is fastened to the hoof, the toe-weight is crowded over these arms, which are thereby drawn toward one another until the lateral extensions thereof come into line with the lateral recesses $a^2$ of the hole $a$. When the toe-weight and fastening device are in this relative position, the recesses and extensions interlock, and thereby the toe-weight is securely held in place. In the form shown this fastening device is formed of a single piece of wire, the ends of which form the spring-arms referred to, while the middle parts thereof are bent to form the two loops $b^2$ $b^2$, through which the screws pass, and between which is preferably a downwardly-extending loop $b^3$, which bears against the hoof and helps to hold said fastening device in a fixed position. This base, composed of these loops, lies and is concealed in the recess in the lower part of the toe-weight when the parts are assembled, as shown.

Having described my invention, I claim—

1. The combination of a toe-weight provided with an upwardly-extended hole having lateral recesses $a^2$, combined with a fastening device comprising a base adapted to be fastened to the horse's hoof, and two upwardly-extended spring-arms having a lateral projection adapted to interlock with said recesses, substantially as and for the purpose specified.

2. The combination of a toe-weight provided with a recess in its rear lower edge and a hole extending therefrom upwardly and having the lateral recesses $a^2$, with a holding device made of a single piece of wire bent to form two approximately parallel arms which are bent laterally between their ends to form extensions $b'$, the middle part of said wire being bent to form loops for the accommodation of screws, substantially as and for the purpose specified.

In testimony whereof I hereunto affix my signature in the presence of two witnesses.

WILLIAM E. SELL.

Witnesses:
 E. L. THURSTON,
 ALBERT H. BATES.